(12) United States Patent
Goto et al.

(10) Patent No.: US 10,126,623 B2
(45) Date of Patent: Nov. 13, 2018

(54) ELECTROCHROMIC DEVICE AND ELECTROCHROMIC DIMMING DEVICE

(71) Applicants: Shun Goto, Ibaraki (JP); Tohru Yashiro, Kanagawa (JP); Kohji Takeuchi, Kanagawa (JP); Sukchan Kim, Tokyo (JP); Takahiko Matsumoto, Kanagawa (JP); Keiichiroh Yutani, Kanagawa (JP); Hidekazu Yaginuma, Kanagawa (JP); Yasuo Katano, Kanagawa (JP); Atsushi Ohshima, Kanagawa (JP)

(72) Inventors: Shun Goto, Ibaraki (JP); Tohru Yashiro, Kanagawa (JP); Kohji Takeuchi, Kanagawa (JP); Sukchan Kim, Tokyo (JP); Takahiko Matsumoto, Kanagawa (JP); Keiichiroh Yutani, Kanagawa (JP); Hidekazu Yaginuma, Kanagawa (JP); Yasuo Katano, Kanagawa (JP); Atsushi Ohshima, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/372,651

(22) Filed: Dec. 8, 2016

(65) Prior Publication Data

US 2017/0176833 A1 Jun. 22, 2017

(30) Foreign Application Priority Data

Dec. 16, 2015 (JP) .................................. 2015-245591

(51) Int. Cl.
*G02F 1/15* (2006.01)
*G02F 1/153* (2006.01)
(Continued)

(52) U.S. Cl.
CPC ............ *G02F 1/1533* (2013.01); *G02C 7/101* (2013.01); *G02F 1/15* (2013.01); *G02F 1/155* (2013.01);
(Continued)

(58) Field of Classification Search
CPC ......... G02C 7/101; G02F 1/1533; G02F 1/15; G02F 1/153; G02F 1/1508; G02F 1/1345
(Continued)

(56) References Cited

U.S. PATENT DOCUMENTS 4,824,221 A 4/1989 Endo et al.
8,384,983 B2 2/2013 Yashiro et al.
(Continued)

FOREIGN PATENT DOCUMENTS

EP 2386901 A1 11/2011
JP 2512880 4/1996
(Continued)

OTHER PUBLICATIONS

European Search Report dated Mar. 20, 2017 in connection with corresponding European patent application No. 16203307.0.

*Primary Examiner* — William R Alexander
(74) *Attorney, Agent, or Firm* — Cooper & Dunham LLP

(57) ABSTRACT

An electrochromic device including: first substrate; first electrode-layer on the first substrate; electrochromic layer on the first electrode-layer; second substrate facing the first substrate; second electrode-layer formed on surface of the second substrate at side of the first substrate; electrolyte layer formed between the electrochromic layer and the second electrode-layer and curable at least with ultraviolet rays; first extraction electrode to electrically connect between the first electrode-layer and power source and including region that does not transmit ultraviolet rays in at least part of the first extraction electrode; and second extrac-
(Continued)

tion electrode to electrically connect between the second electrode-layer and the power source and including region that does not transmit ultraviolet rays in at least part of the second extraction electrode, the region in the first extraction electrode and the region in the second extraction electrode being arranged not to overlap with each other.

11 Claims, 9 Drawing Sheets

(51) Int. Cl.
G02C 7/10 (2006.01)
G02F 1/155 (2006.01)
G02F 1/1345 (2006.01)

(52) U.S. Cl.
CPC .......... G02F 1/1508 (2013.01); *G02F 1/1345* (2013.01)

(58) Field of Classification Search
USPC .................. 359/275, 265, 266, 271, 273; 351/159.39, 159.61
See application file for complete search history.

(56) References Cited

U.S. PATENT DOCUMENTS

| | | | |
|---|---|---|---|
| 8,531,754 B2 | 9/2013 | Fujimura et al. | |
| 8,593,715 B2 | 11/2013 | Yashiro et al. | |
| 8,687,262 B2 | 4/2014 | Yashiro et al. | |
| 8,736,941 B2 | 5/2014 | Naijo et al. | |
| 8,743,048 B2 | 6/2014 | Takahashi et al. | |
| 8,937,758 B2 | 1/2015 | Kim et al. | |
| 9,041,997 B2 | 5/2015 | Takahashi et al. | |
| 9,069,222 B2 | 6/2015 | Naijo et al. | |
| 9,304,368 B2 | 4/2016 | Yashiro et al. | |
| 9,389,480 B2 | 7/2016 | Naijo et al. | |
| 2009/0231663 A1 | 9/2009 | Hirano et al. | |
| 2009/0231664 A1 | 9/2009 | Shibuya et al. | |
| 2011/0211246 A1* | 9/2011 | Agrawal | G02F 1/161 359/267 |
| 2011/0222138 A1 | 9/2011 | Piroux et al. | |
| 2011/0279884 A1 | 11/2011 | Fujimura et al. | |
| 2012/0050838 A1 | 3/2012 | Hirano et al. | |
| 2012/0200908 A1 | 8/2012 | Bergh et al. | |
| 2012/0307337 A1* | 12/2012 | Bartug | B32B 17/10036 359/245 |
| 2013/0057939 A1* | 3/2013 | Yeh | G02F 1/155 359/265 |
| 2014/0043667 A1* | 2/2014 | Bergh | G02F 1/153 359/265 |
| 2014/0043668 A1* | 2/2014 | Bergh | G02F 1/153 359/265 |
| 2014/0043669 A1* | 2/2014 | Bergh | G02F 1/0121 359/275 |
| 2015/0109751 A1 | 4/2015 | Mochizuka | |
| 2015/0168796 A1 | 6/2015 | Yashiro et al. | |
| 2015/0274761 A1 | 10/2015 | Sagisaka et al. | |
| 2015/0331295 A1 | 11/2015 | Takahashi et al. | |
| 2015/0378233 A1 | 12/2015 | Fujimura et al. | |
| 2016/0005375 A1 | 1/2016 | Naijo et al. | |
| 2016/0108072 A1 | 4/2016 | Inoue et al. | |

FOREIGN PATENT DOCUMENTS

| | | |
|---|---|---|
| JP | 2003-161963 | 6/2003 |
| JP | 2010-014917 | 1/2010 |
| JP | 2016-133537 | 7/2016 |

* cited by examiner

ELECTROCHROMIC DEVICE AND ELECTROCHROMIC DIMMING DEVICE

CROSS-REFERENCE TO RELATED APPLICATIONS

The present application claims priority under 35 U.S.C. § 119 to Japanese Patent Application No. 2015-245591, filed Dec. 16, 2015. The contents of which are incorporated herein by reference in their entirety.

BACKGROUND OF THE INVENTION

Field of the Invention

The present disclosure relates to an electrochromic device and an electrochromic dimming device.

Description of the Related Art

Electrochromism is a phenomenon where redox reactions are performed reversibly to reversibly change a color. Devices utilizing the electrochromism are electrochromic devices. Various researches have been performed on the electrochromic devices to develop applications derived from characteristics of the electrochromism.

The electrochromic device typically performs redox reactions with a structure where an electrochromic material is formed between two facing electrodes, and the space between the electrodes is filled with an electrolyte layer capable of conducting ions. Since the electrochromism is an electrochemical phenomenon, a performance (e.g., ion conductivity) of the electrolyte layer affects a response speed or a memory effect of coloring. Fast responses tend to be obtained when the electrolyte layer is a liquid state where an electrolyte is dissolved in a solvent, but an improvement of the electrolyte layer through solidification or gelation has been considered in view of strength of an element and reliability.

When the electrochromic device is used as dimming glass or used for display, at least one side of the electrochromic device needs to be sealed with a transparent material, such as glass and plastic. Therefore, it is difficult to completely seal an electrolyte in with a metal etc. Accordingly, leakage or evaporation of the electrolyte layer is a significant problem. As a method for solving the problem, use of a polymer solid electrolyte is proposed. Examples of the polymer solid electrolyte include solid liquids between a matrix polymer including an oxyethylene chain or an oxypropylene chain and inorganic particles. The above-mentioned solid liquids are completely solids, and excel in processability, but have a problem that conductivity is low.

In order to improve conductivity of the polymer solid electrolyte, for example, proposed are a method where a polymer is dissolved in an organic electrolytic solution to form into a semi-solid, and a method where liquid monomers, to which an electrolyte is added, are allowed to perform a polymerization reaction to form a cross-linked polymer including the electrolyte.

Meanwhile, the electrochromic device includes extraction electrodes configured to connect two electrodes to a power source device in order to apply voltage between the two electrode sandwiching an electrochromic material. It is often a case that two extraction electrodes are bonded to sift the patterns of the two electrodes to create a region where the two electrodes do not face each other.

In case of a transmission electrochromic device, transparent electrodes need to be used as the two electrodes. For example, $SnO_2$, $In_2O_3$, ITO, ZnO, etc. are known as a material of the transparent electrode, but the above-listed materials have high resistance, which causes a problem that a response of an electrochromic reaction is slow.

In order to improve the response, for example, proposed is an electrochromic element, in which a third electrode layer having lower resistance than an upper electrode layer is disposed above the upper electrode layer via a conductive resin layer, and extraction of the upper electrode layer is performed from the third electrode layer (see, for example, Japanese Patent No. 2512880). Moreover, proposed is an electrochromic device, in which a metal grid electrode is formed in a transparent conductive film (see, for example, Japanese Unexamined Patent Application Publication No. 2010-014917).

SUMMARY OF THE INVENTION

According to one aspect of the present disclosure, an electrochromic device includes a first substrate, a first electrode layer formed on the first substrate, an electrochromic layer formed on the first electrode layer, a second substrate facing the first substrate, a second electrode layer formed on a surface of the second substrate at a side of the first substrate, and an electrolyte layer formed between the electrochromic layer and the second electrode layer. The electrolyte layer is curable at least with ultraviolet rays. The electrochromic device includes a first extraction electrode and a second extraction electrode. The first extraction electrode is configured to electrically connect between the first electrode layer and a power source, and includes a region that does not transmit ultraviolet rays in at least part of the first extraction electrode. The second extraction electrode is configured to electrically connect between the second electrode layer and the power source, and includes a region that does not transmit ultraviolet rays in at least part of the second extraction electrode. The region that does not transmit ultraviolet rays in the first extraction electrode and the region that does not transmit ultraviolet rays in the second extraction electrode are arranged not to overlap with each other.

DESCRIPTION OF THE EMBODIMENTS (Electrochromic Device)

Figure 1:
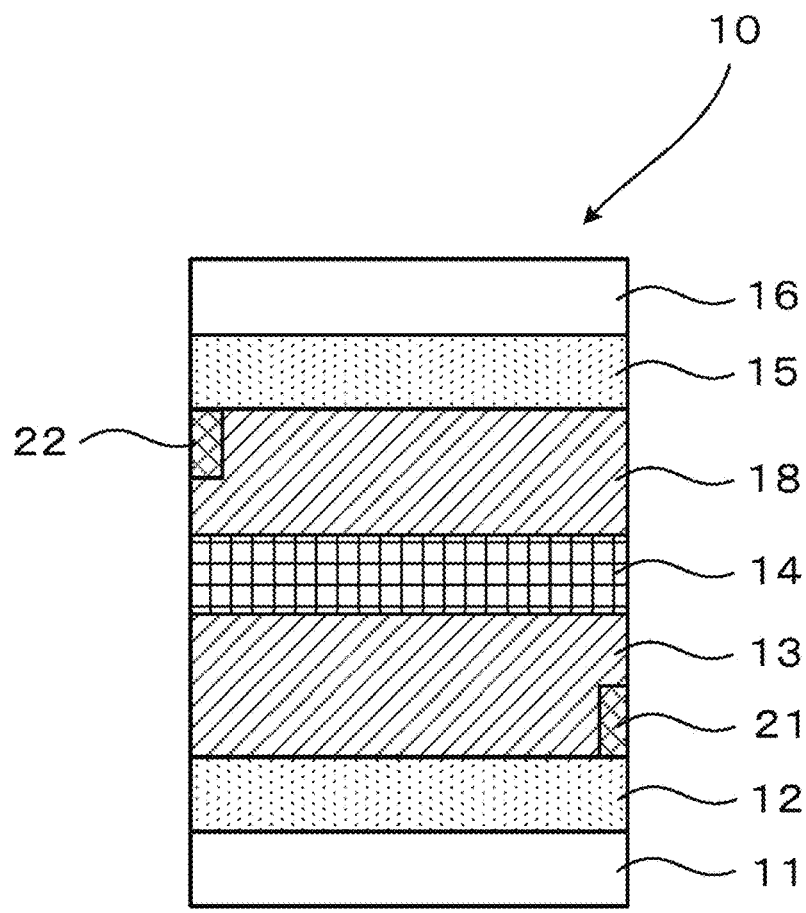
FIG. 1 is a schematic view illustrating one example of the electrochromic device produced in Example 1.

The electrochromic device of the present disclosure includes a first substrate, a first electrode layer formed on the first substrate, an electrochromic layer formed on the first electrode layer, a second substrate facing the first substrate, a second electrode layer formed on a surface of the second substrate at a side of the first substrate, an electrolyte layer, which is formed between the electrochromic layer and the second electrode layer, and is curable at least with ultraviolet rays, a first extraction electrode, which is configured to electrically connect between the first electrode layer and a power source, and includes a region that does not transmit ultraviolet rays in at least part of the first extraction electrode, and a second extraction electrode, which is configured to electrically connect between the second electrode layer and the power source, and includes a region that does not transmit ultraviolet rays in at least part of the second extraction electrode, wherein the region that does not transmit ultraviolet rays in the first extraction electrode and the region that does not transmit ultraviolet rays in the second extraction electrode are arranged not to overlap with each other. The electrochromic device may further include other members according to the necessity.

The electrochromic device of the present disclosure has accomplished based upon the following insight. According to the methods disclosed in Japanese Patent No. 2512880 and Japanese Unexamined Patent Application Publication No. 2010-014917, there is a problem that optical properties, such as transmittance and haze, are compromised because metal electrodes are present in a region where a color changes owing to electrochromism. In the case where a UV-curable resin to which an electrolyte has been added is used when the two electrode are bonded with an ion conductive electrolyte layer being between the two electrode, moreover, curing unevenness is formed in the electrolyte layer because there is a region where ultraviolet rays are not transmitted, such as the metal electrodes, and therefore peel strength is low.

The present disclosure has an object to provide a high performance electrochromic device, which has improved coloring-decoloring properties and a response of coloring-decoloring, without impairing optical characteristics, such as transmittance and haze, and peel strength.

According to the present disclosure, a high performance electrochromic device, which has improved coloring-decoloring properties and a response of coloring-decoloring, without impairing optical characteristics, such as transmittance and haze, and peel strength, can be provided.

The electrochromic device of the present disclosure includes a first extraction electrode, which is configured to electrically connect between the first electrode layer and a power source, and includes a region that does not transmit ultraviolet rays in at least part of the first extraction electrode, and a second extraction electrode, which is configured to electrically connect between the second electrode layer and the power source, and includes a region that does not transmit ultraviolet rays in at least part of the second extraction electrode. Moreover, the region that does not transmit ultraviolet rays in the first extraction electrode and the region that does not transmit ultraviolet rays in the second extraction electrode are arranged not to overlap to each other. Owing to the above-described structure, extraction electrodes of low resistance can be formed without interfering UV irradiation performed to an electrolyte layer, and a coloring-decoloring response can be improved without lowing peek strength because curing unevenness does not occur in the electrolyte layer even when the electrolyte layer curable at least with ultraviolet rays is used.

The region that does not transmit ultraviolet rays in each of the first and second extraction electrodes is disposed in at least part of the extraction electrode, and is preferably disposed in the entire area of the extraction electrode. The region that does not transmit ultraviolet rays in each of the first and second extraction electrodes preferably include at least one metal selected from the group consisting of Au, Ag, Al, Zn, Zr, Ge, Pt, Rd, Ni, W, Pd, Cr, Mo, Cu, and Rh, or an alloy of any of the foregoing metals, and the region more preferably includes Ag—Pd—Cu (APC) alloy in view of adhesion to the electrode layer, a resistance value, and a cost.

The electrolyte layer is curable at least with ultraviolet rays, and is a solid electrode layer formed by allowing a liquid monomer to which an electrolyte has been added to perform a polymerization reaction to form a crosslinked polymer including the electrolyte. Use of such electrolyte layer can improve conductivity compared to a solid electrolyte layer formed of a solid solution between a matric polymer including an oxyethylene chain or an oxy propylene chain and inorganic particles.

The electrochromic device preferably has a curvature formed by forming each layer on a flat resin substrate, followed by thermoforming. Since the curvature is formed in the above-mentioned manner, productivity of formation of coating films is excellent, and a large-scale electrochromic device can be provided. At the same time, the resultant electrochromic device is suitable for optical use, such as lens. It is preferred that thermoforming is performed after all of the layers are formed, but an effect of improving productivity can be obtained by forming a curved surface of the substrate at least including an electrode layer.

In order to prevent splitting of the electrode layer caused by forming a curvature through thermoforming, the maximum length of the major axis of each of the first and second substrates at the curved surface of the electrochromic device after the thermoforming is preferably 120% or less, more preferably 103% or less, relative to the maximum length of the major axis of each of the first and second substrates at a plat surface of the electrochromic device before the thermoforming. When the curvature is 120% or less, the thermoforming can be efficiently performed without splitting the electrode layer.

The above-described thermoforming can be performed by a method where a member is subjected thermoforming using a core and cavity of a mold having a desired three-dimensional shape without fixing edges of the substrate. The heating temperature is set around a softening temperature of a material of the substrates. In the case where a polycarbonate resin is used as a material of the substrates, the heating temperature is preferably 130° C. or higher but 190° C. or lower.

The electrochromic device of the present disclosure will be described with reference to drawings. Note that, in the drawings, identical reference numerals are given to identical structural parts, and duplicated descriptions may be omitted.

FIGS. 1, 3, 7, and 9 are schematic cross-sectional views illustrating examples of the electrochromic device of the present disclosure. Each of these electrochromic devices (10, 20, 30, and 40) include a first substrate 11, a first electrode layer 12 and a first extraction electrode 21 subsequently laminated on the first substrate 11, an electrochromic layer 13, an antidegradation layer 18, a second substrate 16, a second electrode layer 15 and a second extraction electrode 22 subsequently laminated on the second substrate 16, and an electrolyte layer 14 formed between the electrodes facing each other.

In each electrochromic device (10, 20, 30, or 40), the first electrode layer 12 is disposed on the first substrate 11, the first extraction electrode 21 is disposed to be in contact with a partial region of the first electrode layer 12, and the electrochromic layer 13 is disposed to be in contact with the first electrode layer 12 and the first extraction electrode 21.

A second electrode layer 15 is disposed on the electrochromic layer 13 with the electrolyte layer 14 being between the second electrode layer 15 and the electrochromic layer 13, in a manner that the second electrode layer 15 faces the first electrode layer 12, and a second extraction electrode 22 is disposed not to overlap with the first extraction electrode 21.

As a matter of convenience, surfaces facing each other between the first electrode layer 12 and the first extraction electrode 21 and between the second electrode layer 15 and the second extraction electrode 22 are referred as inner surfaces, and a surface opposite to each inner surface is referred to as an outer surface.

An inner surface of the first electrode layer 12 is in contact with the electrochromic layer 13 and an outer surface of the first electrode layer 12 is in contact with the first substrate 11. Moreover, an inner surface of the second electrode layer 15 is in contact with the electrolyte layer 14 and an outer surface of the second electrode layer 15 is in contact with the second substrate 16.

The electrolyte layer 14 is preferably a solid electrolyte and more preferably a solid electrolyte layer to which inorganic particles are mixed. Use of such electrolyte layer can prevent leakage of the electrolyte layer during thermoforming. A material of the electrolyte layer is particularly preferably formed of a solid solution between a matrix polymer including an oxy ethylene chain or an oxypropylene chain and an ionic liquid. An excellent redox reaction is achieved by forming a homogeneous electrolyte layer. Note that, the inorganic particles may be mixed in the electrochromic layer.

When voltage is applied between the first electrode layer 12 and the second electrode layer 15, the electrochromic layer 13 receives and releases electric charges to perform redox reactions to color or decolor the electrochromic device 10.

As described above, the electrochromic device of the present disclosure can realize an electrochromic device having excellent color properties because the organic electrochromic material is used.

<First Substrate and Second Substrate>

The first and second substrate 11 and 16 have a function of supporting the first electrode layer 12, the first extraction electrode 21, the electrochromic layer 13, the electrolyte layer 14, the antidegradation layer 18, the second electrode layer 15, and the second extraction electrode 22.

The first and second substrates 11 and 16 are not particularly limited as long as the substrates can support the above-described layers, and known resin materials that can be thermoformed can be used as they are.

Examples of a material of the first and second substrates 11 and 16 include polycarbonate resins, acrylic resins, polyethylene, polyvinyl chloride, polyester, epoxy resins, melamine resin, phenol resins, polyurethane resins, and polyimide resins. The above-listed materials may be used alone or in combination.

In the case where the electrochromic device 10 is a reflective display device which is viewed from a side of the second electrode layer 15, either the first substrate 11 or the second substrate 16 does not need to be transparent.

In order to enhance water vapor barrier properties, gas barrier properties, and visibility, surfaces of the first and second substrates 11 and 16 may be each coated with a transparent insulating layer or an antireflection layer.

Average thicknesses of the first and second substrates 11 and 16 are set to a range, with which thermoforming can be easily performed, i.e., 0.2 mm or greater but 1.0 mm or less.

<First Electrode Layer, Second Electrode Layer, First Extraction Electrode, and Second Extraction Electrode>

Examples of materials of the first electrode layer 12 and the second electrode layer 15, and the first extraction electrode and the second extraction electrode, as transparent conductive oxide materials, include inorganic materials, such as tin-doped indium oxide (referred to as "ITO" hereinafter), fluorine-doped tin oxide (referred to as "FTO" hereinafter), and antimony-doped tin oxide (referred to as "ATO" hereinafter). The above-listed materials may be used alone or in combination. Among the above-listed examples, preferred is an inorganic material including at least one of indium oxide (referred to as "ITO" hereinafter), tin oxide (referred to as "Sn oxide" hereinafter), and zinc oxide (referred to as "Zn oxide" hereinafter) formed by a vacuum film formation method.

The In oxide, the Sn oxide, and the Zn oxide are materials that are easily formed into a film by sputtering, and are materials that can obtain excellent transparency and conductivity. Among the above-listed materials, InSnO, GaZnO, SnO, $In_2O_3$, ZnO, and InZnO are particularly preferable. Moreover, a transparent network electrode of silver, gold, copper, carbon nanotubes, or metal oxide, or a composite layer of the above-listed electrodes is also effective. The network electrode is an electrode, to which transmittance is imparted by forming a highly conductive non-transparent material, such as carbon nanotubes or others, into a fine network. Moreover, the electrode layer more preferably has a laminate structure where the network electrode and the conductive oxide are laminated. Use of the laminate structure can color the electrochromic layer without unevenness. Note that, the conductive oxide layer can be formed by applying a nano particle ink through coating.

An average thickness of each of the first electrode layer 12 and the second electrode layer 15 is adjusted so that the electric resistance value required for redox reactions of the electrochromic layer 13 is obtained.

In the case where an ITO film formed by vacuum deposition is used as a material of each of the first electrode layer 12 and the second electrode layer 15, the average thickness of each of the first electrode layer 12 and the second electrode layer 15 is preferably 20 nm or greater but 500 nm or less, and more preferably 50 nm or greater but 200 nm or less.

An average thickness of each electrode layer as the conductive oxide layer formed using the nanoparticle ink is preferably 0.2 μm or greater but 5 μm or less. In case of the network electrode, the average thickness of each electrode layer is preferably 0.2 μm or greater but 5 μm or less.

In the case where the electrochromic device is applied as a dimming mirror, moreover, either the first electrode layer 12 or the second electrode layer 15 may have a structure having a reflection function. In the case of the dimming mirror, a metal material may be included as a material of the first electrode layer 12 and the second electrode layer 15. Examples of the metal material include Pt, Ag, Au, Cr, rhodium, alloys of the foregoing metals, and laminate structures of the foregoing metals.

The first extraction electrode and the second extraction electrode are not particularly limited, as long as the first extraction electrode and the second extraction electrode do not transmit ultraviolet rays and have sufficient conductivity. Arbitrary metals or alloys of such metals both typically used as electrodes can be used as the first extraction electrode and the second extraction electrode. In view of cost and handling, examples of the first extraction electrode and the second extraction electrode includes at least one metal selected from the group consisting of Au, Ag, Al, Zn, Zr, Ge, Pt, Rd, Ni, W, Pd, Cr, Mo, Cu, and Rh, alloys of the foregoing metals, and laminate structures of the foregoing metals. Among the above-listed examples, a Ag—Pd—Cu (APC) alloy is preferable.

Examples of a production method of each of the first electrode layer 12, the second electrode layer 15, the first extraction electrode, and the second extraction electrode include vacuum vapor deposition, sputtering, and ion plating.

The production method is not particularly limited and may be appropriately selected depending on the intended purpose, as long as the production method allows a material of each of the first electrode layer 12, the second electrode layer 15, the first extraction electrode, and the second extraction electrode to form a film through coating. Examples of the production method include spin coating, casting, microgravure coating, gravure coating, bar coating, roll coating, wire bar coating, dip coating, slit coating, capillary coating, spray coating, nozzle coating, and various printing methods, such as gravure printing, screen printing, flexo coating, offset printing, reverse printing, and inkjet printing.

<Electrochromic Layer>

The electrochromic layer 13 is a layer including an electrochromic material.

The electrochromic material may be an inorganic electrochromic compound or an organic electrochromic compound. Moreover, a conductive polymer known to exhibit electrochromism may be used as the electrochromic material.

Examples of the inorganic electrochromic compound include tungsten oxide, molybdenum oxide, iridium oxide, and titanium oxide.

Examples of the organic electrochromic compound include viologen, rare earth phthalocyanine, and styryl.

Examples of the conductive polymer include polypyrrole, polythiophene, polyaniline, and derivatives of the foregoing polymers.

The electrochromic layer 13 preferably has a structure where an organic electrochromic compound is born on conductive or semiconductive particles. Specifically, the structure is a structure where particles having the average particle diameter of 5 nm or greater but 50 nm or less are bonded on a surface of the electrode, and an organic electrochromic compound having a polar group, such as phosphonic acid, a carboxyl group, and a silanol group, is adsorbed on surfaces of the particles.

The structure allows electrons to effectively enter the organic electrochromic compound utilizing a large surface effect of the particles. Therefore, a resultant electrochromic device enables high-speed response compared to conventional electrochromic devices. Since a transparent film can be formed as a display layer using the particles, moreover, a high coloring density of the electrochromic dye can be obtained. Moreover, a plurality of organic electrochromic compounds can be born on conductive or semiconductive particles. Furthermore, conductivity of the conductive particles can also serve as an electrode layer.

Examples of the polymer-based or dye-based electrochromic compound include: low-molecular weight organic electrochromic compounds, such as azobenzene-based compounds, anthraquinone-based compounds, diarylethene-based compounds, dihydroprene-based compounds, dipyridine-based compounds, styryl-based compounds, styrylspiropyran-based compounds, spirooxazine-based compounds, spirothiopyran-based compounds, thioindigo-based compounds, tetrathiafulvalene-based compounds, telephthalic acid-based compounds, triphenylmethane-based compounds, triphenylamine-based compounds, naphthopyran-based compounds, viologen-based compounds, pyrazoline-based compounds, phenazine-based compounds, phenylenediamine-based compounds, phenoxazine-based compounds, phenothiazine-based compounds, phthalocyanine-based compounds, fluoran-based compounds, fulgide-based compounds, benzopyran-based compounds, and metallocene-based compounds; and conductive polymer compounds, such as polyaniline, and polythiophene. The above-listed examples may be used alone or in combination. Among the above-listed examples, a viologen-based compounds and dipyridine-based compounds are preferable, and a dipyridine-based compound represented by General Formula (1) is more preferable, because coloring-decoloring potential is low and excellent color values are obtained.

[General Formula (1)]

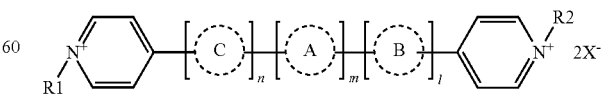

In General Formula (1), R1 and R2 are each independently an alkyl group containing from 1 through 8 carbon atoms, which may have a substituent, or an aryl group, which may have a substituent, and at least one of R1 and R2 has a substituent selected from COOH, PO(OH)$_2$, and Si(OC$_k$H$_{2k+1}$)$_3$ (with the proviso that k is from 1 through 20).

In General Formula (1), X is a monovalent anion. The monovalent anion is not particularly limited and may be appropriately selected depending on the intended purpose, as long as the monovalent anion stably form a pair with a cation site. Examples of the monovalent anion include Br ion (Br$^-$), Cl ion (Cl$^-$), ClO$_4$ ion (ClO$_4^-$), PF$_6$ ion (PF$_6^-$), and BF$_4$ ion (BF$_4^-$).

In General Formula (1), n, m, and l are each independently 0, 1, or 2. In General Formula (1), A, B, and C are each independently an alkyl group containing from 1 through 20 carbon atoms, which may have a substituent, an aryl group, which may have a substituent, or a heterocyclic group, which may have a substituent.

As the metal complex-based or metal oxide-based electrochromic compounds, inorganic electrochromic compounds, such as titanium oxide, vanadium oxide, tungsten oxide, indium oxide, iridium oxide, nickel oxide, and Prussian blue, can be used.

The conductive or semiconductive particles bearing the electrochromic compound are not particularly limited and may be appropriately selected depending on the intended purpose. Metal oxide is preferably used as the conductive or semiconductive particles.

Examples of a material of the metal oxide include meal oxides including, as a main component, titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicic acid, calcium phosphate, or aluminosilicate. The above-listed examples may be used alone or in combination.

Among the above-listed examples, preferred in view of electric properties, such as electroconductivity, or physical properties, such as optical characteristics, is at least one selected from the group consisting of titanium oxide, zinc oxide, tin oxide, zirconium oxide, iron oxide, magnesium oxide, indium oxide, and tungsten oxide. Titanium oxide is particularly preferable because a color display having an excellent coloring-decoloring response speed can be realized.

Shapes of the conductive or semiconductive particles are not particularly limited and may be appropriately selected depending on the intended purpose. In order to efficiently bear the electrochromic compound, shapes of the conductive or semiconductive particles in which a surface area per unit volume (referred to as "specific surface area" hereinafter) is large are used. In the case where the particles are aggregates of nanoparticles, for example, the particles have a large specific surface area, and therefore the electrochromic compound is more efficiently born on the particles and an excellent display contrast ratio of coloring and decoloring can be obtained.

The electrochromic layer 13 and the conductive or semiconductive particle layer can be formed by a vacuum film formation but are preferably formed by coating a particle dispersion paste in view of productivity.

The average thickness of the electrochromic layer 13 is not particularly limited and may be appropriately selected depending on the intended purpose. The average thickness is preferably 0.2 μm or greater but 5.0 μm or less. When the average thickness of the electrochromic layer is 0.2 μm or greater, excellent coloring density can be obtained. When the average thickness of the electrochromic layer is 5.0 μm or less, moreover, an appropriate production cost is achieved, and excellent visibility is realized.

<Electrolyte Layer>

The electrolyte layer 14 is a solid electrolyte layer curable at least with ultraviolet rays, and is formed as a film, in which an electrolyte is held in a UV-curable resin. Moreover, inorganic particles configured to control a thickness of the electrolyte layer are preferably added to the electrolyte layer.

The electrolyte layer is preferably a film prepared by applying a solution, in which the inorganic particles, the UV-curable resin, and the electrolyte are mixed, onto the antidegradation layer 18 through coating, followed by curing through UV irradiation. In the case where the electrochromic layer 13 is a layer where the electrochromic compound is born on the conductive or semiconductive particles, moreover, a solution, in which the UV-curable resin and the electrolyte, is applied to permeate into the electrochromic layer, followed by curing with light or heat to form a film of the electrolyte layer.

As the electrolytic solution, a fluid electrolyte, such as an ionic liquid, or a solution, in which a solid electrolyte is dissolved in a solvent, may be used.

As a material of the electrolyte, for example, an inorganic ion salt, such as an alkali metal salt, and an alkaline earth metal salt, a quaternary ammonium salt, or a supporting electrolyte, such as an acid supporting electrolyte and an alkaline supporting electrolyte, can be used. Examples of the material include LiClO$_4$, LiBF$_4$, LiAsF$_6$, LiPF$_6$, LiCF$_3$SO$_3$, LiCF$_3$COO, KCl, NaClO$_3$, NaCl, NaBF$_4$, NaSCN, KBF$_4$, Mg(ClO$_4$)$_2$, and Mg(BF$_4$)$_2$.

The ionic liquid is not particularly limited, as long as the ionic liquid is a material typically researched or reported. An organic ionic liquid has a molecular structure, which is present as a liquid in a wide temperature range including room temperature. The molecular structure is composed of a cationic component and an anionic component.

Examples of the cationic component include: imidazole derivatives, such as N,N-dimethylimidazole salt, N,N-methylethylimidazole salt, and N,N-methylpropylimidazole salt; aromatic salts such as pyridinium derivatives (e.g., N,N-dimethylpyridinium salt and N,N-methylpropylpyridinium salt); and aliphatic quaternary ammonium-based compounds, such as trimethylpropyl ammonium salt, trimethylhexyl ammonium salt, and triethylhexyl ammonium salt.

The anionic component is preferably a compound including fluorine in view of stability in the atmosphere. Examples of the anionic component include BF$_4^-$, CF$_3$SO$_3^-$, PF$_4^-$, (CF$_3$SO$_2$)$_2$N$^-$, and B(CN$_4$)$^-$. An ionic liquid, in which a combination of any of the above-listed cationic components and any of the above-listed anionic components is formulated, can be used.

The solvent is not particularly limited and may be appropriately selected depending on the intended purpose. Examples of the solvent include propylene carbonate, acetonitrile, γ-butyrolactone, ethylene carbonate, sulfolane, dioxolane, tetrahydrofuran, 2-methyltetrahydrofuran, dimethyl sulfoxide, 1,2-dimethoxyethane, 1,2-ethoxymethoxyethane, polyethylene glycol, alcohols, and mixed solvents of the foregoing solvents.

Examples of the UV-curable resin include acrylic resins, urethane resins, epoxy resins, vinyl chloride resins, ethylene resins, melamine resins, and phenol resins. Among the above-listed examples, a material having high compatibility to an electrolyte is preferable, and derivatives and ethylene glycol, such as polyethylene glycol and polypropylene glycol, are more preferable.

With the UV-curable resin, an electrochromic device can be produced at a low temperature within a short period compared to a method for forming a thin film through thermal polymerization or evaporation of a solvent.

Among the above-listed examples, the electrolyte layer is preferably an electrolyte layer formed of a solid liquid between a matrix polymer including an oxyethylene chain or an oxypropylene chain and an ionic liquid. Since the electrolyte layer has the above-mentioned structure, both hardness and high ion conductivity can be obtained.

The inorganic particles are not particularly limited and may be appropriately selected depending on the intended purpose, as long as the inorganic particles are formed of a material capable of forming a porous layer to hold an electrolyte and a curable resin. In view of stability of an electrochromic reaction and visibility, the inorganic particles are preferably formed of a material having high insulating properties, transparency, and durability.

Examples of the inorganic particles are oxides or sulfides of silicon, aluminium, titanium, zinc, or tin, and mixtures of the foregoing oxides and sulfides.

The volume average particle diameter of the inorganic particles is not particularly limited and may be appropriately selected depending on the intended purpose. The volume average particle diameter is preferably 10 nm or greater but 10 µm or less, more preferably 10 nm or greater but 100 nm or less.

The average thickness of the electrolyte layer formed of the electrolyte is not particularly limited and may be appropriately selected depending on the intended purpose. The average thickness is preferably 100 nm or greater but 10 µm or less.

<Antidegradation Layer>

A role of the antidegradation layer 18 is to perform a reverse chemical reaction to a reaction of the electrochromic layer 13 to balance the charge and prevent corrosion or deterioration of the second electrode layer 15, which may be caused by an irreversible redox reaction. As a result, repetitive stability of the electrochromic device 10 is improved. Note that, the reverse reaction includes to function as a capacitor, as well as oxidation and reduction of the antidegradation layer.

A material of the antidegradation layer 18 is not particularly limited, as long as the material is configured to prevent corrosion of the first electrode layer 12 and the second electrode layer 15, which may be caused by an irreversible redox reaction. As the material of the antidegradation layer 18, for example, antimony-doped tin oxide, nickel oxide, titanium oxide, zinc oxide, tin oxide, or conductive or semiconductive metal oxide containing a plurality of the foregoing materials. In the case where a tint of the antidegradation layer is not a problem, moreover, the material identical to any of the above-mentioned electrochromic materials can be used.

Especially when an electrochromic device is produced as an optical element requiring transparency, such as lens, a material having high transparency is preferably used as the antidegradation layer 18. As such a transparent material, n-type semiconductive oxide particles (n-type semiconductive metal oxide) are preferably used. Specific examples of the n-type semiconductive oxide particles include particles of titanium oxide, tin oxide, and zinc oxide, and compound particles containing a plurality of the above-listed materials, all of which are composed of particles having primary particle diameters of 100 nm or smaller, and a mixture including any combination of the above-listed materials.

In the case where any of the above-listed materials is used as the antidegradation layer 18, the electrochromic layer is preferably a material that changes a color through an oxidation reaction. As a result, the n-type semiconductive metal oxide is easily reduced (injected with electrons) at the same time as the oxidation reaction of the electrochromic layer, to thereby reduce driving voltage.

In the above-described embodiment, the particularly preferable electrochromic material is an organic polymer material. The organic polymer material can be easily formed into a film through a coating process, and a color of the film can be adjusted or controlled with a molecular structure of the organic polymer material. Specific examples of the organic polymer material include materials disclosed in, for example, "Navigating the Color Palette of Solution-Processable Electrochromic Polymers" *Chemistry of Materials Review*, 2011. 23, pp. 397-415 (Reynolds), *Macromolecules*, 1996. 29, pp. 7629-7630 (Reynolds), and "Electrochromic Organic Metallic Hybrid Polymers" Polymer journal, Vol. 41, No. 7.

Examples of the organic polymer material include poly (3,4-ethylenedioxythiophene)-based materials, and polymer formed of complexes of bis(terpyridine) and iron ions.

A material of a p-type semiconductive layer having high transparency as the antidegradation layer 18 is an organic material including nitroxy radicals (NO radicals). Examples of the material include derivatives of 2,2,6,6-tetramethylpiperidine-N-oxyl (TEMPO), and polymer materials of the derivatives.

Note that, an antidegradation function can be imparted to the electrolyte layer 14 by blending a material for an antidegradation layer into the electrolyte layer 14, without forming an antidegradation layer 18.

A formation method of the antidegradation layer 18 is not particularly limited and may be appropriately selected depending on the intended purpose. Examples of the formation method include vacuum vapor deposition, sputtering, and ion plating. In the case where a material of the antidegradation layer 18 is coatable, examples of the formation method include spin coating, casting, microgravure coating, gravure coating, bar coating, roll coating, wire bar coating, dip coating, slit coating, capillary coating, spray coating, nozzle coating, and various printing methods, such as gravure printing, screen printing, flexo printing, offset printing, reverse printing, and inkjet printing.

<Other Members>

The above-mentioned other members are not particularly limited and may be appropriately selected depending on the intended purpose, and examples of such members include an insulating porous layer, and a protective layer.

(Electrochromic Dimming Device)

The electrochromic dimming device of the present disclosure includes the electrochromic device of the present disclosure, and may further include other members according to the necessity.

For example, the electrochromic dimming device is suitably used as electrochromic dimming spectacles, glare-proof mirrors, or dimming glass. Among the above-listed examples, electrochromic dimming spectacles are preferable.

The above-mentioned other members are not particularly limited and are appropriately selected depending on use. Examples of the members include a frame of spectacles, a power source, and switches.

Figure 13:
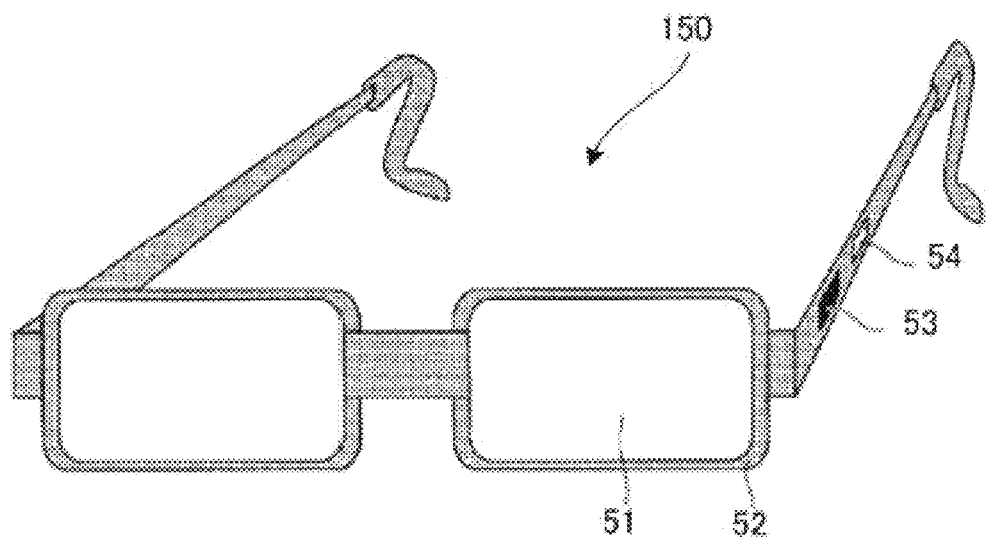
FIG. 13 is a perspective view illustrating one example of electrochromic dimming spectacles including the electrochromic device of the present disclosure.

FIG. 13 is a perspective view illustrating electrochromic dimming spectacles including the electrochromic dimming device of the present disclosure. With reference to FIG. 13, the electrochromic dimming spectacles 150 includes electrochromic dimming devices 51, and a frame 52 of the spectacles, a switch 53, and a power source 54. The electrochromic dimming device 51 is the electrochromic dimming device of the present disclosure, which has been processed into a desired shape.

A pair of the electrochromic dimming devices 51 are incorporated in the frame 52 of the spectacles. The switch 53 and the power source 54 are disposed onto the frame 52 of the spectacles. The power source 54 is electrically connected to the first electrode layer and the second electrode layer with lines (not illustrated) through the switch 53.

By using the switch 53, one state can be selected, for example, from a state where positive voltage is applied between the first electrode layer and the second electrode layer, a state where negative voltage is applied between the first electrode layer and the second electrode layer, and a state where no voltage is applied.

As the switch 53, for example, an arbitrary switch, such as a slide switch and a push switch, can be used, as long as the switch is a switch capable of switching between at least the above-mentioned three states.

As the power source 54, for example, an arbitrary DC power source, such as a button battery and a solar, battery, can be used. The power source, 54 is capable of apply the voltage of about negative or positive (±) several voltages between the first electrode layer and the second electrode layer.

For example, the pair of the electrochromic dimming devices 51 color in the predetermined color, when positive voltage is applied between the first electrode layer and the second electrode layer. Moreover, the pair of the electrochromic dimming devices 51 decolor and become transparent, when negative voltage is applied between the first electrode layer and the second electrode layer.

However, there is a case where the electrochromic dimming devices color when negative voltage is applied between the first electrode layer and the second electrode layer, and the electrochromic dimming devices decolor and become transparent when positive voltage is applied, depending on properties of a material used for the electrochromic layer. Once the electrochromic dimming devices color, the color is maintained without applying voltage between the first electrode layer and the second electrode layer.

EXAMPLES

The present disclosure will be described in more detail by ways of the following Examples, but the present disclosure should not be construed as being limited to these Examples.

Example 1

<Production of Electrochromic Device>

Example 1 describes an example where the electrochromic device 10 illustrated in FIG. 1 is produced. Note that, the electrochromic device 10 produced in Example 1 can be used as a dimming lens device.

—Formation of First Electrode Layer, First Extraction Electrode, and Electrochromic Layer—

First, an oval polycarbonate substrate having a major axis of 80 mm, a minor axis of 55 mm, and an average thickness of 0.5 mm was provided as a first substrate 11.

An ITO film having an average thickness of 100 nm was formed on the oval polycarbonate substrate by sputtering to form a first electrode layer 12. Next, a Ag—Pd—Cu (APC) alloy film having an average thickness of 150 nm was formed on a rim at the minor axis side of the first electrode layer 12 with a width of 5 mm from an edge of the minor axis side of the first electrode layer 12 by sputtering to form a first extraction electrode 21.

Next, a titanium oxide nanoparticle dispersion liquid (product name: SP210, available from Showa Denko Ceramics Co., Ltd., average particle diameter: 20 nm) was applied onto a surface of the ITO film by spin coating, and annealing was performed thereon for 15 minutes at 120° C. to form a nano-structure semiconductor material formed of a titanium oxide particle film having an average thickness of 1.0 μm.

Subsequently, a 2,2,3,3-tetrafluoropropanol solution including 1.5% by mass of a compound represented by Structural Formula A below as an electrochromic compound was applied by spin coating, followed by performing annealing for 10 minutes at 120° C. to make the titanium oxide particle film bear (adsorb) the electrochromic compound to thereby form an electrochromic layer 13.

[Structural Formula A]

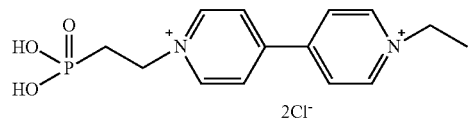

—Formation of Second Electrode Layer, Second Extraction Electrode, and Antidegradation Layer—

A polycarbonate substrate having the same shape and thickness of the first substrate 11 was provided as a second substrate 16.

An ITO film having an average thickness of 100 nm was formed on the oval polycarbonate substrate by sputtering to form a second electrode layer 15. Next, a Ag—Pd—Cu (APC) alloy film having an average thickness of 150 nm was formed on a rim of the minor axis side of the second electrode layer 15 with a width of 5 mm from an edge of the minor axis side of the second electrode layer 15 by sputtering to form a second extraction electrode 22.

Next, an ATO particle dispersion liquid (ATO average particle diameter: 20 nm, a dispersion liquid prepared by adding 6% by mass of a urethane-based binder (HW140SF, available from DIC Corporation) to a 6% by mass 2,2,3,3-tetrafluoropropanol solution) was applied onto a surface of the ITO film by spin coating, and annealing was performed thereon for 15 minutes at 120° C. to form an antidegradation layer 18 formed of an ATO particle film having an average thickness of 1.0 μm.

—Bonding—

Subsequently, a solution, in which polyethylene diacrylate (PEG400DA, available from Nippon Kayaku Co., Ltd.), a photopolymerization initiator (IRG184, available from BASF), and an electrolyte (1-ethyl-3-methylimidazolium salt) were mixed at a mass ratio of 100:5:40, was applied onto a surface of the electrochromic layer 13 above the first substrate 11). The resultant was bonded with a surface of the antidegradation layer 18 above the second substrate 16 in a manner that the extraction electrodes 21 and 22 at the side of the minor axis were not overlapped with each other (see FIG. 2), and the above-described applied solution was cured with UV to form a solid electrolyte layer 14. In the manner as described above, an electrochromic device 10 was produced.

Figure 2:
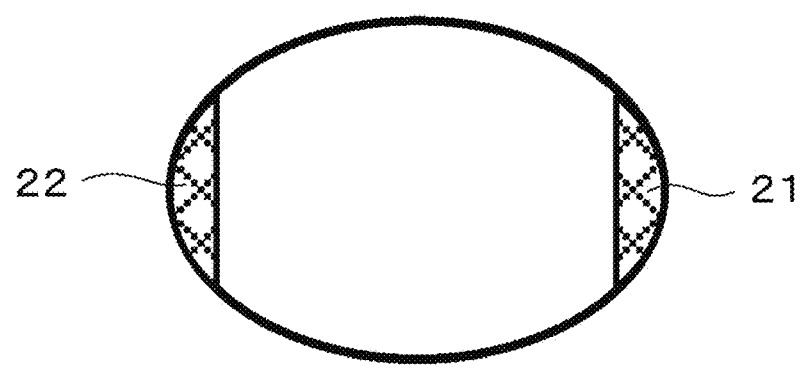
FIG. 2 is a schematic view illustrating an arrangement state of first and second extraction electrodes as viewing the electrochromic device of FIG. 1 from a side of a second substrate.

Note that, FIG. 2 is a schematic view illustrating an arrangement state of the first and second extraction electrodes 21 and 22 when the produced electrochromic device 10 of FIG. 1 is viewed from the side of the second substrate 16.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Example 1 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Example 2

<Production of Electrochromic Device>

Figure 3:
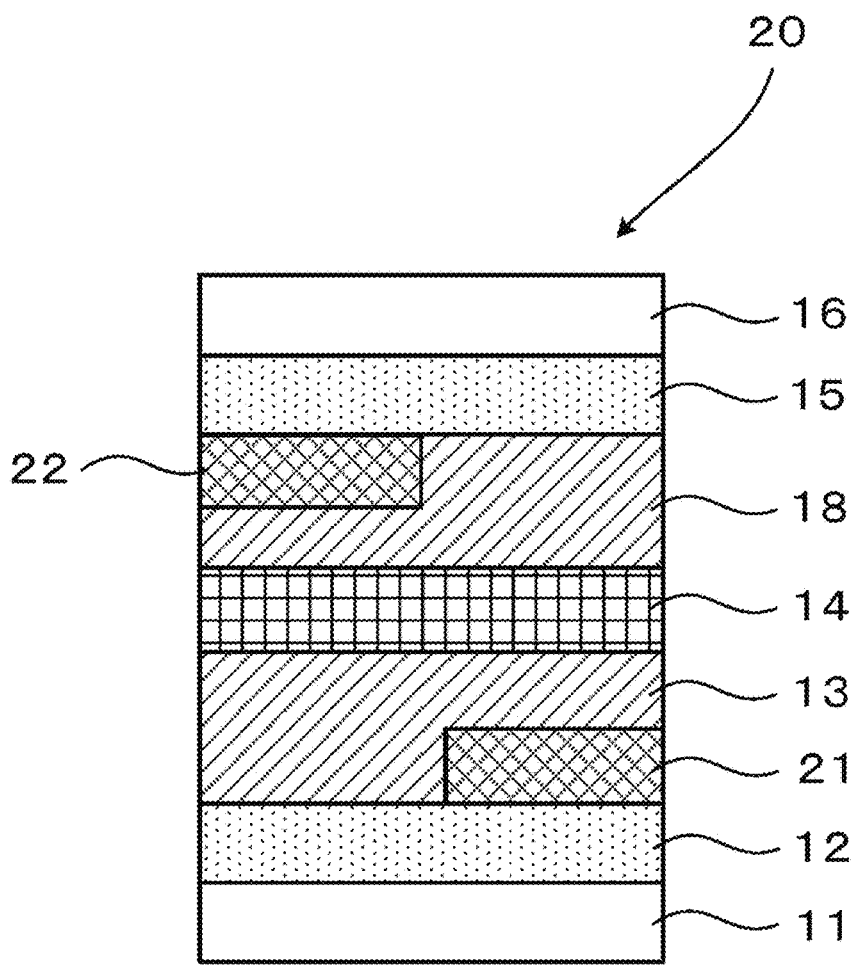
FIG. 3 is a schematic view illustrating one example of the electrochromic device produced in Example 2.

Example 2 describes an example where the electrochromic device 20 illustrated in FIG. 3 is produced. Note that, the electrochromic device 20 produced in Example 2 can be used as a dimming lens device.

Figure 4:
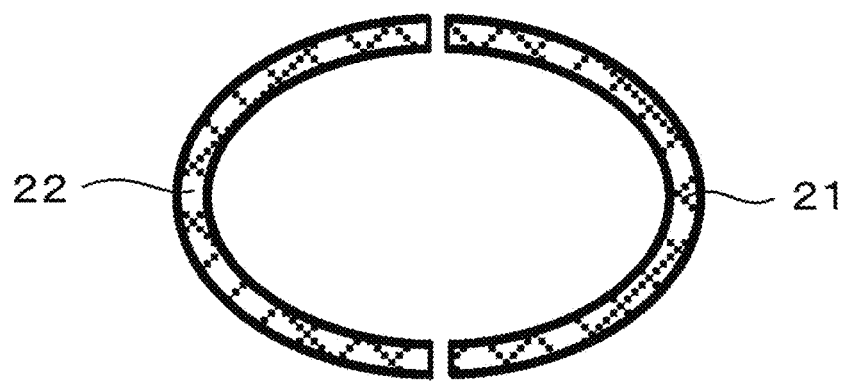
FIG. 4 is a schematic view illustrating an arrangement state of first and second extraction electrodes as viewing the electrochromic device of FIG. 3 from a side of a second substrate.

An electrochromic device 20 was produced in the same manner as in Example 1, except that extraction electrodes 21 and 22 were each formed by forming an Ag—Pd—Cu (APC) alloy film having an average thickness of 150 nm by sputtering on a rim of the minor axis side of the first substrate 11 or the second substrate 16 with a width of 5 mm from an edge, which extended to a rum at the major axis side up to about a half the length of the major axis with a width of 5 mm from the edge, as illustrated in FIG. 4.

Note that, FIG. 4 is a schematic view illustrating an arrangement state of the first and second extraction electrodes 21 and 22 when the produced electrochromic device 20 illustrated in FIG. 3 is viewed from a side of the second substrate 16.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Example 2 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Comparative Example 1

<Production of Electrochromic Device>

Figure 5:
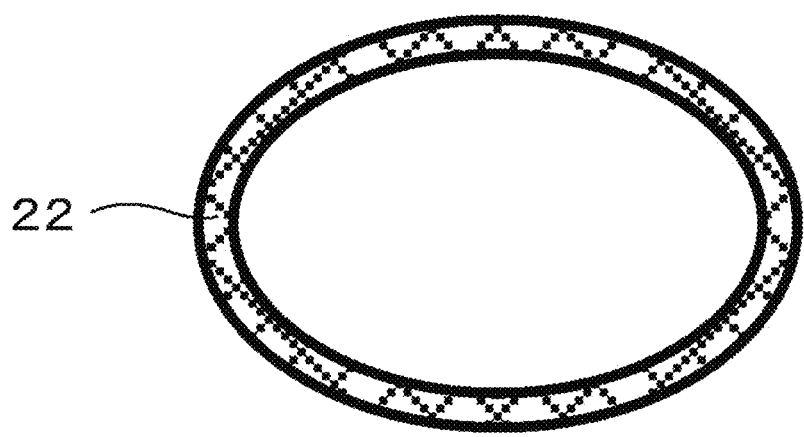
FIG. 5 is a schematic view illustrating an arrangement state of a second extraction electrode as viewing the electrochromic device of Comparative Example 1 from a side of a second substrate.
Figure 6:
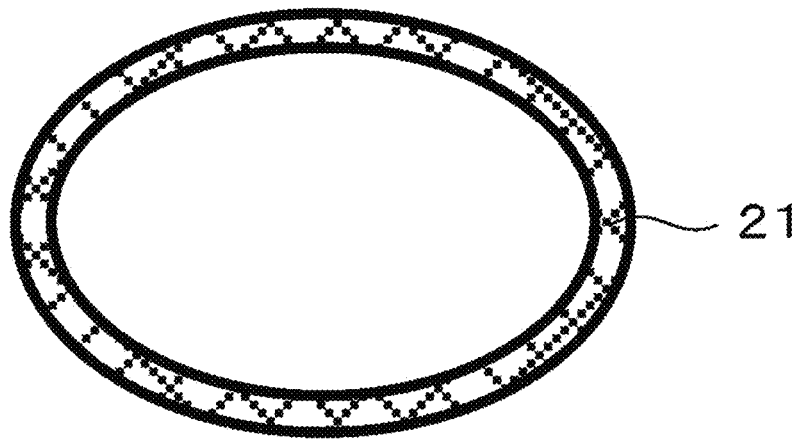
FIG. 6 is a schematic view illustrating an arrangement state of a first extraction electrode as viewing a first substrate from a side of the electrochromic device of Comparative Example 1.

An electrochromic device was produced in the same manner as in Example 1, except that extraction electrodes 21 and 22 were each formed by forming an Ag—Pd—Cu (APC) alloy film having an average thickness of 150 nm by sputtering on the entire circumference of the first substrate 11 or the second substrate 16 with a width of 5 mm from an edge, as illustrated in FIGS. 5 and 6.

Note that, FIG. 5 is a schematic view illustrating an arrangement state of the second extraction electrode 22 when the produced electrochromic device is viewed from a side of the second substrate 16. FIG. 6 is a schematic view illustrating an arrangement state of the first extraction electrode 21 when the produced electrochromic device is viewed from a side of the first substrate 11.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Comparative Example 1 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Comparative Example 2

<Production of Electrochromic Device>

An electrochromic device was produced in the same manner as in Example 1, except that instead of the extraction electrodes, an ITO film having an average thickness of 150 nm was formed on the entire circumferences of both the first substrate 11 and the second substrate 16 with a width of 5 mm from the edges of the substrates by sputtering. The average thickness of the ITO film of the circumference region combined with the ITO films of the electrode layers was 250 nm in total.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Comparative Example 2 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Example 3

<Production of Electrochromic Device>

Figure 7:
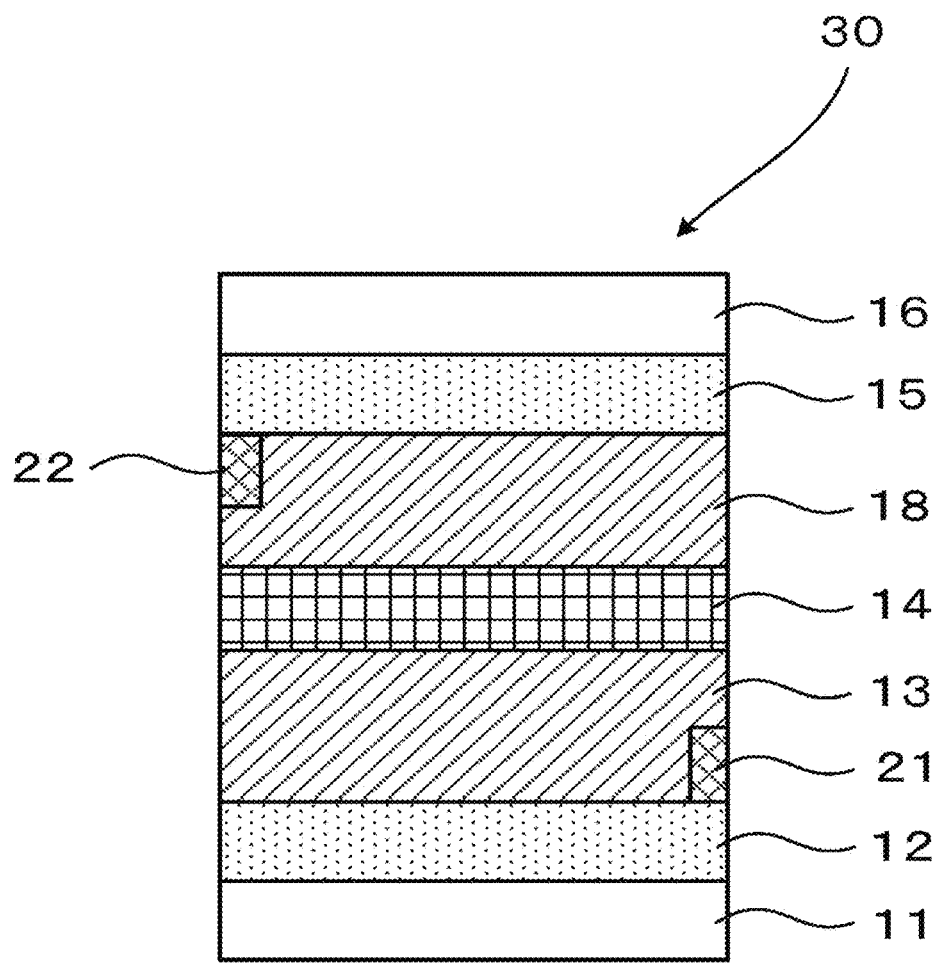
FIG. 7 is a schematic view illustrating one example of the electrochromic device produced in Example 3.

Example 3 describes an example where the electrochromic device 30 illustrated in FIG. 7 is produced. Note that, the electrochromic device 30 produced in Example 3 can be used as a dimming lens device.

—Formation of First Electrode Layer, First Extraction Electrode, and Electrochromic Layer—

First, a rectangular polycarbonate substrate having a major axis of 80 mm, a minor axis of 55 mm, and an average thickness of 0.5 mm was provided as a first substrate 11.

An ITO film having an average thickness of 100 nm was formed on the rectangular polycarbonate substrate by sputtering to form a first electrode layer 12. Next, a Ag—Pd—Cu (APC) alloy film having an average thickness of 150 nm was formed on a rim of the first electrode layer 12 at a side of the minor axis with a width of 5 mm from an edge of the minor axis side of the first electrode layer 12 to form a first extraction electrode 21.

Next, a titanium oxide nanoparticle dispersion liquid (product name: SP210, available from Showa Denko Ceramics Co., Ltd., average particle diameter: 20 nm) was applied onto a surface of the ITO film by spin coating, and annealing was performed thereon for 15 minutes at 120° C. to form a nano-structure semiconductor material formed of a titanium oxide particle film having an average thickness of 1.0 μm.

Subsequently, a 2,2,3,3-tetrafluoropropanol solution including 1.5% by mass of a compound represented by Structural Formula A below as an electrochromic compound was applied by spin coating, followed by performing annealing for 10 minutes at 120° C. to make the titanium oxide particle film bear (adsorb) the electrochromic compound to thereby form an electrochromic layer 13.

[Structural Formula A]

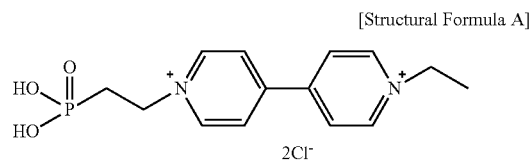 [SMILES: CC[n+]1ccc(-c2cc[n+](CCP(=O)(O)O)cc2)cc1]

—Formation of Second Electrode Layer, Second Extraction Electrode, and Antidegradation Layer—

A polycarbonate substrate having the same shape and thickness of the first substrate 11 was provided as a second substrate 16.

An ITO film having an average thickness of 100 nm was formed on the rectangular polycarbonate substrate by sputtering to form a second electrode layer 15. Next, a Ag—Pd—Cu (APC) alloy film having an average thickness of 150 nm was formed on a rim of the second electrode layer 15 at a side of the minor axis with a width of 5 mm from an edge of the minor axis side of the second electrode layer 15 by sputtering to form a second extraction electrode 22.

Next, an ATO particle dispersion liquid (ATO average particle diameter: 20 nm, a dispersion liquid prepared by adding 6% by mass of a urethane-based binder (HW140SF, available from DIC Corporation) to a 6% by mass 2,2,3,3-tetrafluoropropanol solution) was applied onto a surface of the ITO film by spin coating, and annealing was performed thereon for 15 minutes at 120° C. to form an antidegradation layer 18 formed of an ATO particle film having an average thickness of 1.0 μm.

—Bonding—

Subsequently, a solution, in which polyethylene diacrylate, a photopolymerization initiator (IRG184, available from BASF), and an electrolyte (1-ethyl-3-methylimidazolium salt) were mixed at a mass ratio of 100:5:40, was applied onto a surface of the electrochromic layer 13 above the first substrate 11. The resultant was bonded with a surface of the antidegradation layer 18 above the second substrate 16 in a manner that the extraction electrodes 21 and 22 at the side of the minor axis were not overlapped with each other (see FIG. 8), and the above-described applied solution was cured with UV to form a solid electrolyte layer 14. In the manner as described above, an electrochromic device 30 was produced.

Figure 8:
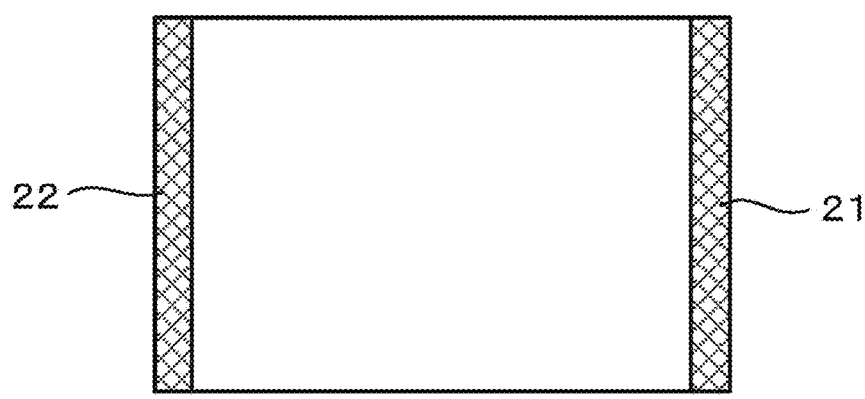
FIG. 8 is a schematic view illustrating an arrangement state of first and second extraction electrodes as viewing the electrochromic device of FIG. 7 from a side of a second substrate.

Note that, FIG. 8 is a schematic view illustrating an arrangement state of the first and second extraction electrodes 21 and 22 when the produced electrochromic device 30 of FIG. 7 is viewed from the side of the second substrate 16.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Example 3 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Example 4

<Production of Electrochromic Device>

Figure 9:
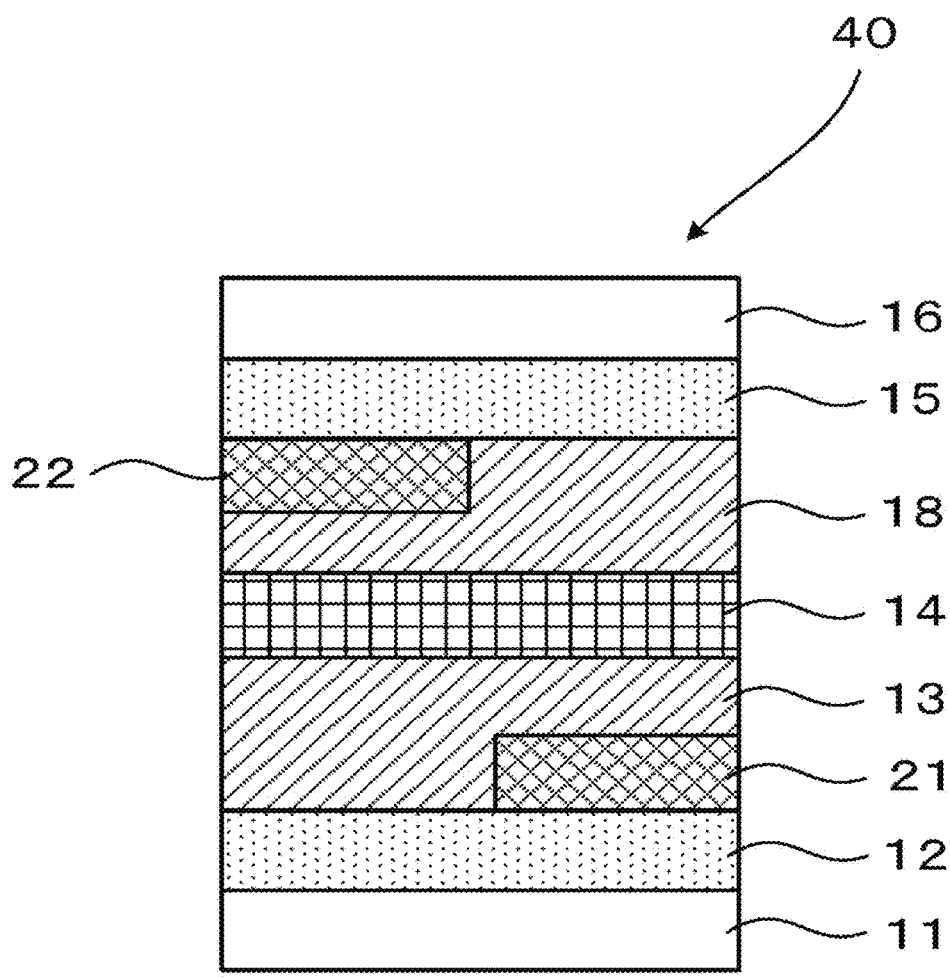
FIG. 9 is a schematic view illustrating one example of the electrochromic device produced in Example 4.

Example 4 describes an example where the electrochromic device 40 illustrated in FIG. 9 is produced. Note that, the electrochromic device 40 produced in Example 4 can be used as a dimming lens device.

Figure 10:
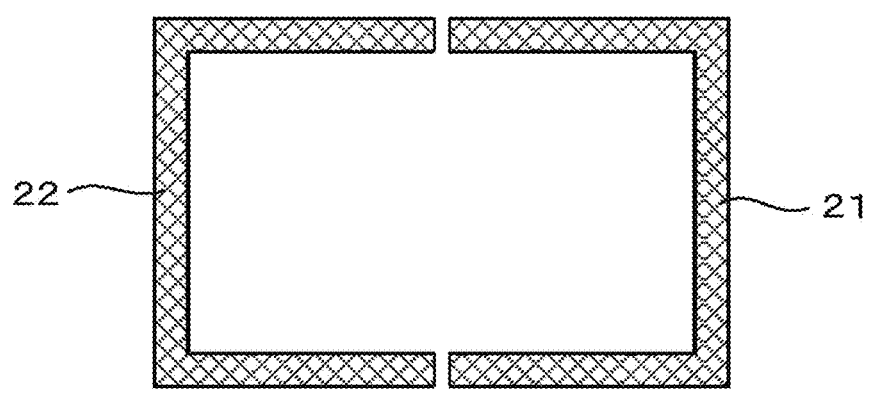
FIG. 10 is a schematic view illustrating an arrangement state of first and second extraction electrodes as viewing the electrochromic device of FIG. 9 from a side of a second substrate.

An electrochromic device 40 was produced in the same manner as in Example 3, except that extraction electrodes 21 and 22 were formed by forming an Ag—Pd—Cu (APC) alloy film having an average thickness of 150 nm by sputtering on a rim of the minor axis side of the first substrate 11 or the second substrate 16 with a width of 5 mm from an edge, which extended to a rum at the major axis side up to about a half the length of the major axis with a width of 5 mm from the edge, as illustrated in FIG. 10.

Note that, FIG. 10 is a schematic view illustrating an arrangement state of the first and second extraction electrodes 21 and 22 when the produced electrochromic device 40 illustrated in FIG. 9 is viewed from a side of the second substrate 16.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Example 4 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Comparative Example 3

<Production of Electrochromic Device>

Figure 11:
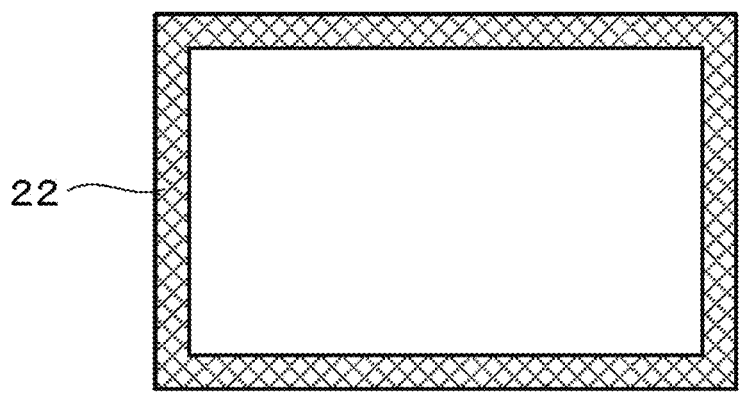
FIG. 11 is a schematic view illustrating an arrangement state of a second extraction electrode as viewing the electrochromic device of Comparative Example 3 from a side of a second substrate.
Figure 12:
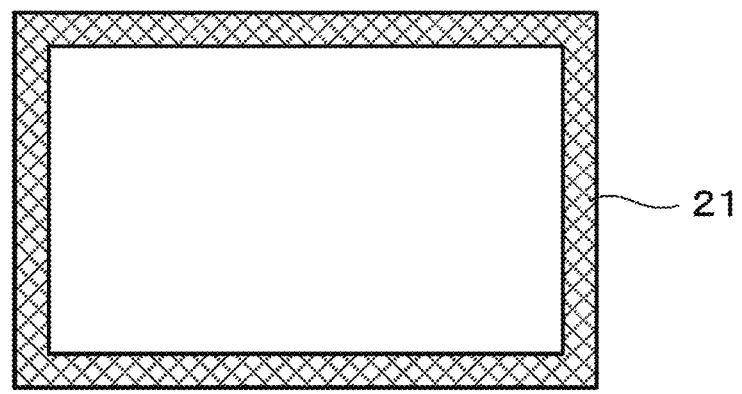
FIG. 12 is a schematic view illustrating an arrangement state of a first extraction electrode as viewing the electrochromic device of Comparative Example 3 from a side of a first substrate.

An electrochromic device was produced in the same manner as in Example 3, except that extraction electrodes 21 and 22 were each formed by forming an Ag—Pd—Cu (APC) alloy film having an average thickness of 150 nm by sputtering on the entire circumference of the first substrate 11 or the second substrate 16 with a width of 5 mm from an edge, as illustrated in FIGS. 11 and 12.

Note that, FIG. 11 is a schematic view illustrating an arrangement state of the second extraction electrode 22 when the produced electrochromic device is viewed from a side of the second substrate 16. FIG. 12 is a schematic view illustrating an arrangement state of the first extraction electrode 21 when the produced electrochromic device is viewed from a side of the first substrate 11.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Comparative Example 3 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Comparative Example 4

<Production of Electrochromic Device>

An electrochromic device was produced in the same manner as in Example 3, except that instead of the extraction electrodes, an ITO film having an average thickness of 150 nm was formed on the entire circumferences of both the first substrate 11 and the second substrate 16 with a width of 5 mm from the edges of the substrates by sputtering. The average thickness of the ITO film of the circumference region combined with the ITO films of the electrode layers was 250 nm in total.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Comparative Example 4 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Comparative Example 5

Figure 14:
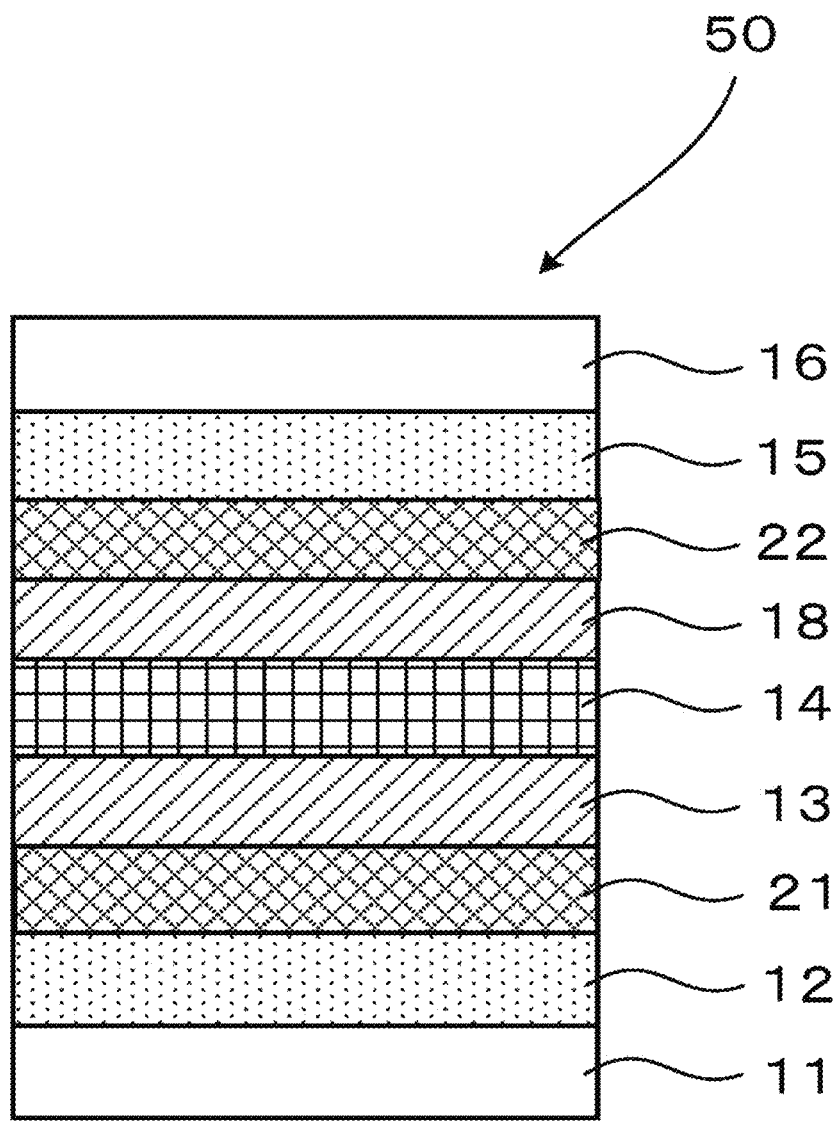
FIG. 14 is a schematic view illustrating one example of the electrochromic device produced in Comparative Example 5.

An electrochromic device was produced in the same manner as in Example 1, except that a groove of a line pattern having a width of 20 μm and a depth of 3 μm was formed on an entire surface of both the first substrate 11 and the second substrate 16, where the line pitch was 5 mm, and a metal electrode line composed of a silver paste (CA-405NL, available from DAIKEN CHEMICAL CO., LTD.) was formed on each groove region using a screen having an opening pattern identical to the line pattern to form extraction electrodes 21 and 22, as illustrated in FIG. 14.

Figure 15:
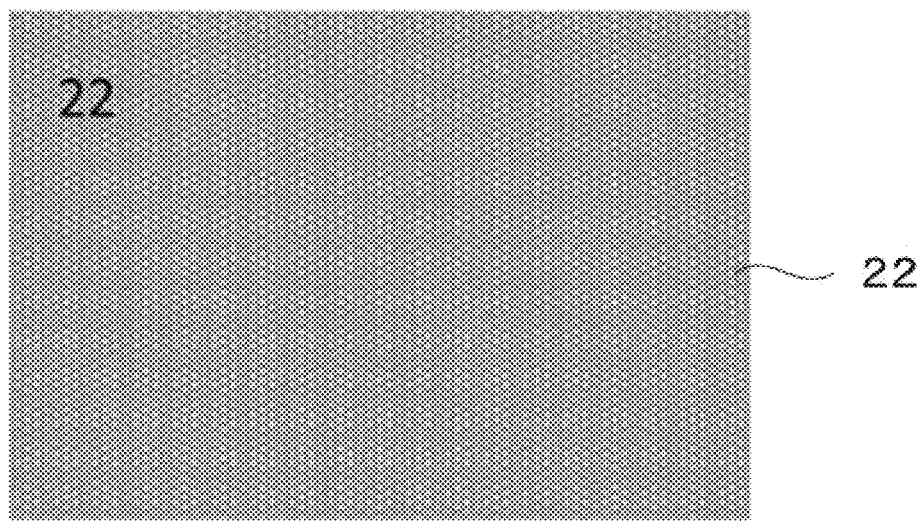
FIG. 15 is a schematic view illustrating a second extraction electrode as viewing the electrochromic device of FIG. 14 from a side of a second substrate.
Figure 16:
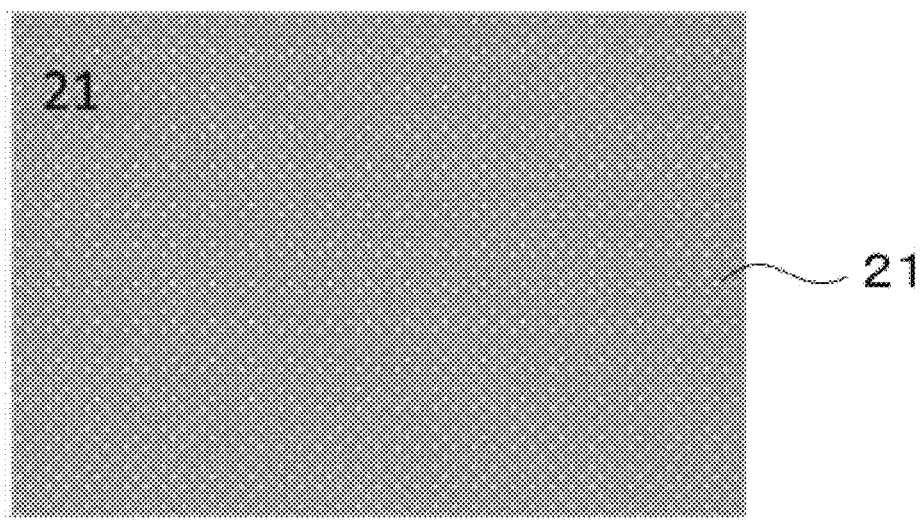
FIG. 16 is a schematic view illustrating a first extraction electrode as viewing the electrochromic device of FIG. 14 from a side of a first substrate.

Note that, FIG. 15 is a schematic view illustrating the second extraction electrode 22 when the produced electrochromic device is viewed from a side of the second substrate 16. FIG. 16 is a schematic view illustrating the first extraction electrode 21 when the produced electrochromic device is viewed from a side of the first substrate 11.

—Thermoforming—

The produced electrochromic device was nipped between a core and a cavity of a mold having a curvature of 90 mm at 135° C. to produce the electrochromic device having a three-dimensional (3D) spherical surface. As described above, the electrochromic device having the curvature of Comparative Example 5 was produced.

The maximum length of the major axis of the substrate at the curved surface of the electrochromic device after the thermoforming was 81 mm, and the maximum length of the major axis of the substrate at the curved surface of the electrochromic device after the thermoforming was (81 mm/80 mm)×100=101.3% relative to the maximum length of the major axis of the substrate at a flat surface of the electrochromic device before the thermoforming.

Next, coloring and decoloring, peel strength, transmittance, and haze of each of the obtained electrochromic devices were evaluated in the following manner. The results are presented in Tables 1 and 2.

<Evaluation of Coloring and Decoloring>

Voltage (−3.5 V) was applied between the first extraction electrode 21 and the second extraction electrode 22 of each electrochromic device in a manner that the first extraction electrode was to be a negative electrode. As a result, it was confirmed that the electrochromic devices of Examples and Comparative Examples colored in magenta originated from the electrochromic compound represented by Structural Formula A.

The electrochromic device of Examples 1 and 3 took 3 seconds to sufficiently color entirely and uniformly, and the electrochromic devices of Examples 2 and 4 took 2 seconds to sufficiently color entirely and uniformly.

The electrochromic devices of Comparative Examples 1 and 3 took 2 seconds to sufficiently color entirely and uniformly, but the circumferential part of the extraction electrode was partially peeled, and coloring was not confirmed in the partial region.

The electrochromic devices of Comparative Examples 2 and 4 took 4 seconds to sufficiently color entirely and uniformly.

The electrochromic device of Comparative Example 5 took 2 seconds to sufficiently color entirely and uniformly.

Next, voltage (+3.5 V) was applied the first extraction electrode 21 and the second extraction electrode 22 of each electrochromic device for 2 seconds. As a result, it was confirmed that the color of the electrochromic compound was disappeared and each electrochromic device became transparent.

[Evaluation Criteria]

A: The time required for sufficiently coloring entirely and uniformly was 3 seconds or shorter, and coloring and decoloring were excellent.

B: The time required for sufficiently coloring entirely and uniformly was longer than 3 seconds, and coloring and decoloring were poor.

<Evaluation of Peel Strength>

The circumferential part of each of the produced electrochromic devices was visually observed to evaluate presence of peeling.

<Evaluation of Transmittance>

The transmittance of the decolored state of each of the produced electrochromic devices was measured by means of NDH5000 available from NIPPON DENSHOKU INDUSTRIES CO., LTD., and evaluated based on the following criteria.
[Evaluation Criteria]
A: The transmittance was 80% or greater and was excellent.
B: The transmittance was less than 80% and was poor.
<Evaluation of Haze>
The haze of the decolored state of each of the produced electrochromic devices was measured by means of NDH5000 available from NIPPON DENSHOKU INDUSTRIES CO., LTD. according to the JIS standard, and evaluated based on the following criteria.
[Evaluation Criteria]
A: The haze was less than 2.0 and was excellent.
B: The haze was 2.0 or greater and was poor.

TABLE 1

| | First and second extraction electrodes | | | Coloring and decoloring | |
| --- | --- | --- | --- | --- | --- |
| | Type | Arrangement | Color | Response time until sufficiently colors entirely and uniformly | Evaluation |
| Ex. 1 | APC (UV-opaque) | FIGS. 1 and 2 | Magenta | 3 seconds | A |
| Ex. 2 | APC (UV-opaque) | FIGS. 3 and 4 | Magenta | 2 seconds | A |
| Comp. Ex. 1 | APC (UV-opaque) | FIGS. 5 and 6 | Magenta | 2 seconds | A |
| Comp. Ex. 2 | ITO (UV-transmittable) | FIGS. 1 and 2 | Magenta | 4 seconds | B |
| Ex. 3 | APC (UV-opaque) | FIGS. 7 and 8 | Magenta | 3 seconds | A |
| Ex. 4 | APC (UV-opaque) | FIGS. 9 and 10 | Magenta | 2 seconds | A |
| Comp. Ex. 3 | APC (UV-opaque) | FIGS. 11 and 12 | Magenta | 2 seconds | A |
| Comp. Ex. 4 | ITO (UV-transmittable) | FIGS. 7 and 8 | Magenta | 4 seconds | B |
| Comp. Ex. 5 | Silver grid electrode (UV-opaque) | FIGS. 14, 15, 16 | Magenta | 2 seconds | A |

TABLE 2

| | Curvature (%) by thermoforming | Peeling strength | Transmittance | Haze |
| --- | --- | --- | --- | --- |
| Ex. 1 | 101.3 | No peeling | A | A |
| Ex. 2 | 101.3 | No peeling | A | A |
| Comp. Ex. 1 | 101.3 | Peeling | A | A |
| Comp. Ex. 2 | 101.3 | No peeling | A | A |
| Ex. 3 | 101.3 | No peeling | A | A |
| Ex. 4 | 101.3 | No peeling | A | A |
| Comp. Ex. 3 | 101.3 | Peeling | A | A |
| Comp. Ex. 4 | 101.3 | No peeling | A | A |
| Comp. Ex. 5 | 101.3 | No peeling | B | B |

For example, embodiments of the present disclosure are as follows.
<1> An electrochromic device including:
a first substrate;
a first electrode layer formed on the first substrate;
an electrochromic layer formed on the first electrode layer;
a second substrate facing the first substrate;
a second electrode layer formed on a surface of the second substrate at a side of the first substrate;
an electrolyte layer, which is formed between the electrochromic layer and the second electrode layer, and is curable at least with ultraviolet rays;
a first extraction electrode, which is configured to electrically connect between the first electrode layer and a power source, and includes a region that does not transmit ultraviolet rays in at least part of the first extraction electrode; and
a second extraction electrode, which is configured to electrically connect between the second electrode layer and the power source, and includes a region that does not transmit ultraviolet rays in at least part of the second extraction electrode,
wherein the region that does not transmit ultraviolet rays in the first extraction electrode and the region that does not transmit ultraviolet rays in the second extraction electrode are arranged not to overlap with each other.
<2> The electrochromic device according to <1>,
wherein the region that does not transmit ultraviolet rays in the extraction electrode is a region including at least one metal selected from the group consisting of Au, Ag, Al, Zn, Zr, Ge, Pt, Rd, Ni, W, Pd, Cr, Mo, Cu, and Rh, or an alloy including any of foregoing metals.
<3> The electrochromic device according to <2>,
wherein the region that does not transmit ultraviolet rays in the extraction electrode is a region including Ag—Pd—Cu alloy.
<4> The electrochromic device according to any one of <1> to <3>,
further including a solid electrolyte layer curable at least with ultraviolet rays, where the solid electrolyte layer is disposed between the electrochromic layer and the second electrode layer.
<5> The electrochromic device according to any one of <1> to <4>,
wherein the electrode layer is formed of a solid solution between a matrix polymer including an oxyethylene chain or an oxypropylene chain, and an ionic liquid.
<6> The electrochromic device according to any one of <1> to <5>,
wherein a thickness of each of the first electrode layer and the second electrode layer is 20 nm or greater but 500 nm or less.
<7> The electrochromic device according to any one of <1> to <6>,
wherein the electrochromic layer includes a viologen-based compound or a pyridine-based compound.

<8> The electrochromic device according to any one of <1> to <7>,
wherein an average thickness of the electrochromic layer is 0.2 μm or greater but 5 μm or less.
<9> The electrochromic device according to any one of <1> to <8>,
wherein the electrochromic device has a curvature.
<10> The electrochromic device according to <9>,
wherein the curvature is formed by thermoforming.
<11> The electrochromic device according to <10>,
wherein a maximum length of a major axis of each of the first substrate and the second substrate at a curved surface of the electrochromic device after the thermoforming is 120% or less relative to a maximum length of the major axis of each of the first substrate and the second substrate at a plate surface of the electrochromic device before the thermoforming.
<12> The electrochromic device according to <10> or <11>,
wherein a maximum length of a major axis of each of the first substrate and the second substrate at a curved surface of the electrochromic device after the thermoforming is 103% or less relative to a maximum length of the major axis of each of the first substrate and the second substrate at a plate surface of the electrochromic device before the thermoforming.
<13> The electrochromic device according to any one of <1> to <12>,
further including
an antidegradation layer formed in contact with the second electrode layer.
<14> The electrochromic device according to any one of <1> to <13>,
wherein at least one of the first electrode layer and the second electrode layer includes a conductive metal, a conductive oxide, or conductive carbon.
<15> An electrochromic dimming device including
the electrochromic device according any one of <1> to <14>.
<16> The electrochromic dimming device according to <15>,
wherein the electrochromic dimming device is a pair of electrochromic dimming spectacles.

The electrochromic device according to any one of <1> to <14> and the electrochromic dimming device according to <15> or <16> can solve the above-described various problems in the art, and can achieve the object of the present disclosure.

What is claimed is:
1. An electrochromic device comprising:
a first substrate;
a first electrode layer formed on the first substrate;
an electrochromic layer formed on the first electrode layer;
a second substrate facing the first substrate;
a second electrode layer formed on a surface of the second substrate at a side of the first substrate;
an electrolyte layer, which is formed between the electrochromic layer and the second electrode layer, and is curable at least with ultraviolet rays;
a first extraction electrode, which is configured to electrically connect between the first electrode layer and a power source, and includes a region that does not transmit ultraviolet rays in at least part of the first extraction electrode; and
a second extraction electrode, which is configured to electrically connect between the second electrode layer and the power source, and includes a region that does not transmit ultraviolet rays in at least part of the second extraction electrode,
wherein the region that does not transmit ultraviolet rays in the first extraction electrode and the region that does not transmit ultraviolet rays in the second extraction electrode are arranged not to overlap with each other, and
wherein at least one of (i) the region that does not transmit ultraviolet rays in the first extraction electrode and (ii) the region that does not transmit ultraviolet rays in the second extraction electrode is a region including an Ag alloy, and
wherein the first extraction electrode, including the region that does not transmit ultraviolet rays, contacts the first electrode layer and contacts the electrochromic layer.
2. The electrochromic device according to claim 1,
wherein the region that does not transmit ultraviolet rays in the extraction electrode is a region including at least one metal selected from the group consisting of Au, Ag, Al, Zn, Zr, Ge, Pt, Rd, Ni, W, Pd, Cr, Mo, Cu, and Rh, or an alloy including any of foregoing metals.
3. The electrochromic device according to claim 1,
wherein the electrochromic device has a curvature.
4. The electrochromic device according to claim 3,
wherein the curvature is formed by thermoforming.
5. An electrochromic device comprising:
a first substrate;
a first electrode layer formed on the first substrate;
an electrochromic layer formed on the first electrode layer;
a second substrate facing the first substrate;
a second electrode layer formed on a surface of the second substrate at a side of the first substrate;
an electrolyte layer, which is formed between the electrochromic layer and the second electrode layer, and is curable at least with ultraviolet rays;
a first extraction electrode, which is configured to electrically connect between the first electrode layer and a power source, and includes a region that does not transmit ultraviolet rays in at least part of the first extraction electrode; and
a second extraction electrode, which is configured to electrically connect between the second electrode layer and the power source, and includes a region that does not transmit ultraviolet rays in at least part of the second extraction electrode,
wherein the region that does not transmit ultraviolet rays in the first extraction electrode and the region that does not transmit ultraviolet rays in the second extraction electrode are arranged not to overlap with each other, and
wherein the region that does not transmit ultraviolet rays in the extraction electrode is a region including Ag—Pd—Cu alloy.
6. The electrochromic device according to claim 5,
wherein the electrochromic device has a curvature.
7. The electrochromic device according to claim 6,
wherein the curvature is formed by thermoforming.
8. An electrochromic dimming device comprising:
an electrochromic device, which comprises:
a first substrate;
a first electrode layer formed on the first substrate;
an electrochromic layer formed on the first electrode layer;
a second substrate facing the first substrate;
a second electrode layer formed on a surface of the second substrate at a side of the first substrate;

an electrolyte layer, which is formed between the electrochromic layer and the second electrode layer, and is curable at least with ultraviolet rays;

a first extraction electrode, which is configured to electrically connect between the first electrode layer and a power source, and includes a region that does not transmit ultraviolet rays in at least part of the first extraction electrode; and a second extraction electrode, which is configured to electrically connect between the second electrode layer and the power source, and includes a region that does not transmit ultraviolet rays in at least part of the second extraction electrode, wherein the region that does not transmit ultraviolet rays in the first extraction electrode and the region that does not transmit ultraviolet rays in the second extraction electrode are arranged not to overlap with each other, and wherein at least one of the region that does not transmit ultraviolet rays in the first extraction electrode and the region that does not transmit ultraviolet rays in the second extraction electrode is a region including an Ag alloy, and wherein the first extraction electrode, including the region that does not transmit ultraviolet rays, contacts the first electrode layer and contacts the electrochromic layer.

9. The electrochromic dimming device according to claim 8, wherein one of the region that does not transmit ultraviolet rays in the first extraction electrode and the region that does not transmit ultraviolet rays in the second extraction electrode is formed of a material including an Ag alloy, and wherein the other of the region that does not transmit ultraviolet rays in the first extraction electrode and the region that does not transmit ultraviolet rays in the second extraction electrode is formed of a material including Ag—Pd—Cu alloy.

10. The electrochromic dimming device according to claim 8, wherein the electrochromic device has a curvature.

11. The electrochromic dimming device according to claim 10, wherein the curvature is formed by thermoforming.

* * * * *